March 10, 1964   G. B. CANDELA   3,124,228
SPRAG CLUTCH AND ENERGIZING MEANS THEREFOR
Filed Nov. 20, 1961
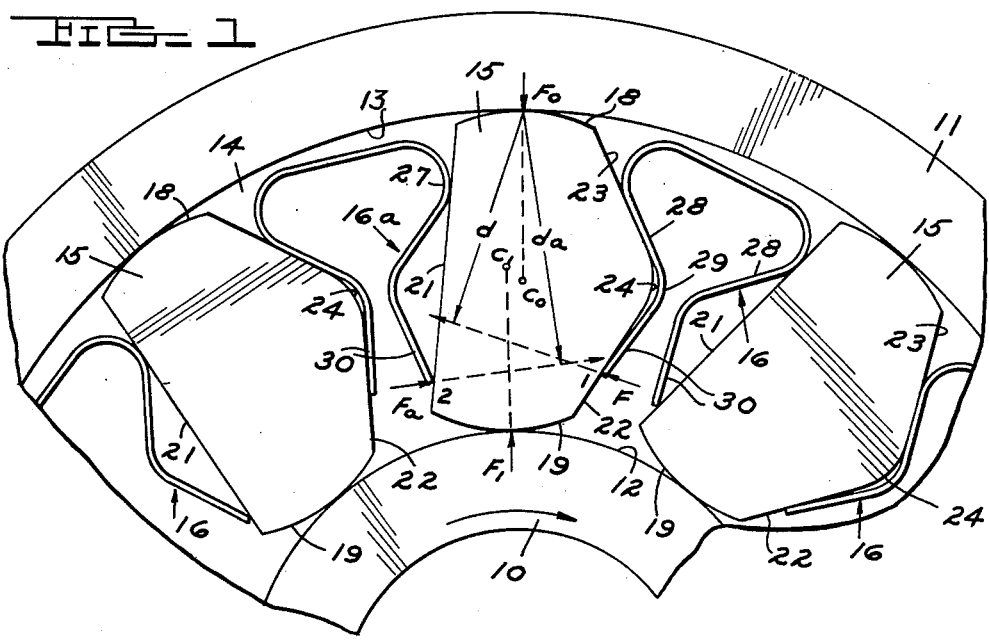
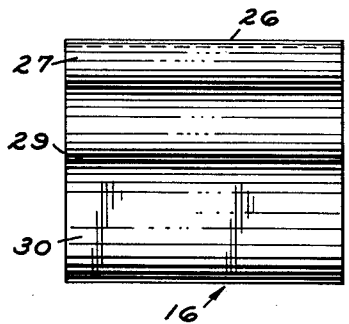
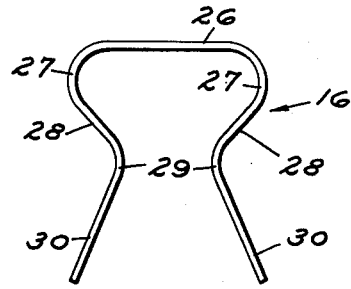
INVENTOR.
GIOVAN B. CANDELA
BY Whittemore, Hulbert
Belknap
ATTORNEYS

United States Patent Office 3,124,228
Patented Mar. 10, 1964

3,124,228
SPRAG CLUTCH AND ENERGIZING MEANS THEREFOR
Giovan B. Candela, East Detroit, Mich., assignor to Formsprag Company, Warren, Mich., a corporation of Michigan
Filed Nov. 20, 1961, Ser. No. 153,430
9 Claims. (Cl. 192—45.1)

The present invention relates to improvements in a rotative clutch of the sprag type, and to automatic energizing means therefor, in the form of individual leaf springs of an improved type, which also act as circumferential spacers for the sprags of the clutch. Specifically, the invention contemplates the provision of individual leaf springs of a special contour having special engaging relationships to successive sprags of a series for the automatic resilient energizing of such sprags for clutching engagement between coaxial races, and for maintaining the sprags in properly spaced relation to one another in the circumferential sense in the annular space between the races.

It is a general object of the invention to provide a sprag and leaf spring energizing clutch wherein the springs, as individually related to and between successive sprags of a series, enable an individual and better energization of the individual sprags in relation to the coaxial races.

Another object is to provide a sprag and energizing spring arrangement devoid of interengagement between successive sprags tending to prevent the latter from energizing properly.

A further object is to provide a sprag clutch and spring combination wherein spaces of substantial size are provided between successive sprags in which grease can be stored and used to lubricate the action of the sprags relative to the races and the energizing springs relative to the sprags, thus providing a substantial improvement in a type of sprag clutch which is normally grease-packed for a lifetime operation.

More specifically, it is an object of the invention to provide a sprag clutch featuring a succession of circumferentially spaced sprags of the so-called D-type, together with individual energizing springs between the respective sprags of the succession or series. These springs are fabricated of leaf spring steel in an outline, in a free or uncompressed condition thereof, which is generally U-shaped, with inwardly concave formations of the legs of the D-outline provided well inwardly of the outer free leg ends, the constricted or restricted waist-effect at these formations being emphasized when the spring is compressed and inserted between successive sprags of the D-type.

As so assembled, one leg of a spring acting against an adjacent, generally arcuate side of a sprag tends to urge the latter clockwise about its center of gravity, while the opposite leg of another spring engaging at a point along the opposite, generally rectilinear side of the same sprag, will tend to urge the same counterclockwise. As operatively positioned, the moment arm of these respective legs differs, that of the counterclockwise force-imparting leg being greater. The result is that the sprag in question is resiliently energized against one of the clutch races, for example the inner race, under a force moment representing the differential of the spring force exerted at the longer effective moment arm of the last named leg, times the distance between its line of application and action and the point of rolling engagement of the sprag with the other, or outer race, and the corresponding, smaller force couple represented by the force exerted at the first named leg, times the distance of its line of application and action to the same point of rolling engagement of the sprag at the outer race.

In accordance with the invention, the manner of installation of the compressed, generally U-shaped springs is such that the enlarged bight portion thereof to one side of the constricted waist areas, for example, radially outwardly thereof, engages successive sprags to space the same properly in a circumferential series about the axis of the clutch, the bight portion being held in position for this spacing action by a nesting engagement of one of the constricted waist areas of the spring with a circumferential convexity of an adjacent sprag.

The foregoing as well as other objects will become more apparent as this description proceeds, especially when considered in connection with the accompanying drawing illustrating the invention, wherein:

FIG. 1 is a fragmentary view in end elevation through a sprag clutch incorporating the improved sprag and energizing and spacing spring means in accordance with the invention;

FIG. 2 is an end elevation of an individual energizing spring component according to the invention, shown in its relaxed form; and FIG. 3 is a side elevational view of the spring of FIG. 2.

As illustrated in FIG. 1 of the invention, the clutch of the invention comprises a pair of coaxial race members 10, 11, respectively, presenting an inner cylindrical race surface 12 and an outer cylindrical race surface 13 in predetermined, radially spaced relation to one another. The annular space 14 between the races 10, 11 receives a circumferentially spaced series of sprags 15 and leaf type springs, generally designated 16, in accordance with the invention, in alternation with the sprags and acting to automatically energize the same toward position for clutching engagement between the race surfaces 12 and 13, and to properly space the sprags 15 uniformly about the axis of the clutch.

Each sprag 15 is of the so-called D-shape, featuring an outer camming or wedging surface 18 of arcuate outline, and a radially opposite inner arcuate wedging or camming surface 19. The surfaces 18, 19 are shown as being in the form of arcs of circles having centers at $C_0$ and $C_1$ in FIG. 1 of the drawing. Sprag 15 further comprises a planar wall or surface 21 constituting one radial side thereof, this surface being disposed, when the sprag is operatively mounted between races 10 and 11 to connect corresponding margins of the wedging surfaces 18, 19, on a line offset somewhat from a radius of the clutch.

Each sprag 15 is provided on its opposite circumferentially facing side, with a composite surface including a planar wall portion 22 extending from one edge of the wedging surface 19 outwardly at a less acute angle to the clutch radius than the surface 21, a generally similar but oppositely inclined, planar outer wall portion 23, and an arcuate center portion 24 of quasi-cylindrical outline merging smoothly with and connecting the respective planar portions 22, 23, the latter of which extends to an edge of wedging surface 18.

These configurations constitute the cams 15 to be of the known D-shaped type, save, of course, for the fact that they lack any type of energizing spring receiving formation, other than at their external surfaces, for example spring receiving grooves or recesses at opposite axial ends of the sprags, as commonly employed. In use, and as energized by the improved springs 16 to be described, the outer wedging surface 18 is adapted to have rolling and wedging engagement with outer race surface 13 under a force $F_0$ exerted at the upper vertical arrow of FIG. 1; while the lower wedging surface 19 similarly has wedging engagement with inner race surface 12 under a force $F_1$ at the location indicated by the lower vertical arrow of FIG. 1.

As illustrated in FIG. 2, each spring 16, shown in a relaxed condition in FIG. 2, is in the form of a leaf spring of inverted U-shaped outline, generally speaking, having an axial length as shown in FIG. 3 approximating that of the sprags 15 along whose circumferentially facing sides it acts. In a typical installation, a spring will be of S.A.E. 1065 spring steel, hardened, and drawn to $R_c$–40–45. It comprises a central, circumferentially elongated upper bridge portion 26 extending substantially rectilinearly between arcuate corner lobes 27 of circular outline, from which its lobes converge at portions 28 to inwardly concave, rounded waist formations 29 of mild curvature, at which the legs diverge downwardly and outwardly at 30 to their free ends. The spring 16 is preferably proportioned to have a spring tension of 8.0 to 12.0 oz. reading when fully compressed, with its waist portions 29 engaging one another.

As operatively installed to the clutch between the sprags of the series, as illustrated in FIG. 1, the springs 16 are substantially compressed; and for the purpose of the following description, one of the springs, i.e., that to the left of the centermost sprag 15 as viewed in FIG. 1, is specially designated in that figure as $16_a$, the spring on the opposite side of the sprag bearing the normal designation 16.

As installed, the fully illustrated spring 16 last referred to has a generally nesting engagement in respect to the adjacent curved surface portion 24 of the sprag, having substantially line or area engagement with the latter above the zone of the waist portion 29, and converging linearly in relation to the lower planar surface portion 22 of the sprag, engaging the latter at the end of the spring's foot.

In contrast, the opposite, planar surface 21 of sprag 15 has substantially line engagement along its axial length by the rounded shoulder portion 27 of the adjacent spring $16a$, the latter again engaging the surface 21 adjacent the lower portion of the latter, at the end of the spring leg portion 30. Thus, in operation and as installed under compression between the sprags 15, the fully illustrated spring 16 will exert a force F at 1 on the surface portion 22 of the sprag acting to urge the latter in clockwise direction about the center of gravity of the sprag. The force moment effective upon the sprag is the product of F times the distance $d$ from the line of force application at point 1 to the point of engagement of the sprag with the outer race surface 13 at $F_0$.

On the other hand, a force $F_a$ is applied oppositely by the other spring $16_a$ at a point 2 on planar surface portion 21; the force moment in this case acting in the counterclockwise direction and being represented by the product of force $F_a$ times the distance $d_a$ of its line of application to the sprag from the point of outer race engagement at $F_0$, the distance $d_a$ substantially exceeding the distance $d$, as appears in FIG. 1.

Thus the energizing force moment applied to the sprag to engage its wedging surface 19 against inner race surface 12 is represented by the differential of the moments acting at 1 and 2; and, considering the inner race to be a driver acting clockwise in the direction of the curved arrow of FIG. 1, its race surface 12 will wedge against sprag surface 19, when so rotated, and correspondingly rotate outer race 11. By the same token, if the rotation of race 10 is counterclockwise, or if the speed of rotation of race 11 exceeds that of race 10, overrun will occur in a known fashion.

It is seen that the bight portion of spring 16, outwardly of its inwardly convergent waist portions 29, serves as a stable spacer for successive sprags 15, being sustained by the nesting or mating relationship of the waist portion 29 relative to the adjacent rounded center portion 24 of the contacted sprag, with rounded shoulder portion 27 and leg portion 30 also having stable engagement against spaced points on the planar surface of the succeeding sprag.

The invention affords a sprag clutch having improved and simplified energizing provisions in the form of individual springs lacking substantial frictional engagement with the sprag or tending to snag against the latter in a manner to tend to prevent the sprags from energizing properly and freely. Likewise, inter-sprag friction is avoided, and the spacing provisions of the springs enable the packing of the clutches with grease for an effective lubrication throughout their life.

What I claim as my invention is:

1. A sprag clutch comprising coaxial races having cylindrical race surfaces in radially spaced relation to one another, circumferentially spaced sprags oriented similarly in succession in the radial space between said races, said sprags having first and second arcuate, radially spaced surfaces for wedging engagement with and between said race surfaces, and being provided with generally radially extending side surfaces of different contour on circumferentially opposite sides of the sprag, and individual energizing leaf springs acting in the circumferential spaces between successive sprags and on said respective differently contoured surfaces thereof to urge each sprag toward wedging engagement with one of the race surfaces, said leaf springs each being of a generally U-shaped outline having a bight portion between spaced, convexly outwardly rounded shoulders, a pair of legs converging from said shoulders to inwardly concave waist portions which are relatively closely adjacent one another when the spring is compressed in engagement between successive sprags, and terminal leg portions diverging from said respective waist portions, one leg of each spring having engagement at a shoulder and terminal leg portion thereof with one of said radially extending surfaces of a sprag at one circumferential side of the spring, the other leg having engagement at its waist portion with the differently contoured surface of the sprag on the opposite circumferential side of the spring, said bight portion of the spring having stable engagement with said sprags on opposite sides thereof to space the latter circumferentially.

2. A sprag clutch comprising coaxial races having cylindrical race surfaces in radially spaced relation to one another, circumferentially spaced sprags oriented similarly in succession in the radial space between said races, said sprags having first and second arcuate, radially spaced surfaces for wedging engagement with and between said race surfaces, and being provided with generally radially extending side surfaces which are, respectively, of relatively flat and compound, convexly rounded contour on circumferentially opposite sides of the sprag to constitute an irregular sprag outline in radial section at 90° to the race axes, being circumferentially outwardly convex at at least one of said surfaces, and individual energizing leaf springs acting in the circumferential spaces between successive sprags and on said respective differently contoured surfaces thereof to urge each sprag toward wedging engagement with one of the race surfaces, said leaf springs each being of a generally U-shaped outline having a bight portion between spaced, convexly outwardly rounded shoulders, a pair of legs converging from said shoulders to inwardly concave waist portions which are relatively closely adjacent one another when the spring is compressed in engagement between successive sprags, and terminal leg portions diverging from said respective waist portions, one leg of each spring having engagement at a shoulder and terminal leg portion thereof with one of said radially extending surfaces of a sprag at one circumferential side of the spring, the other leg having a nested engagement at its waist portion with the differently contoured, circumferentially convex surface of the sprag on the opposite circumferential side of the spring, said bight portion of the spring having stable engagement with said sprags on opposite sides thereof to space the latter circumferentially.

3. A sprag clutch comprising coaxial races having cylindrical race surfaces in radially spaced relation to one another, circumferentially spaced sprags oriented similarly in succession in the radial space between said races, said sprags having first and second arcuate, radially spaced surfaces for wedging engagement with and between said race surfaces, and being provided with generally radially extending side surfaces which are, respectively, of relatively flat and compound, convexly rounded contour on circumferentially opposite sides of the sprag to constitute a substantially D-shaped sprag outline in radial section at 90° to the race axes, and individual energizing leaf springs acting in the circumferential spaces between successive sprags and on said respective differently contoured surfaces thereof to urge each sprag toward wedging engagement with one of the race surfaces, said leaf springs each being of a generally U-shaped outline having a bight portion between spaced, convexly outwardly rounded shoulders, a pair of legs converging from said shoulders to inwardly concave waist portions which are relatively closely adjacent one another when the spring is compressed in engagement between successive sprags, and terminal leg portions diverging from said respective waist portions, one leg of each spring having engagement at a shoulder and terminal leg portion thereof with said relatively flat surface of a sprag at one circumferential side of the spring, the other leg having a nested engagement at its waist portion with the convexly rounded surface of the sprag on the opposite circumferential side of the spring, said bight portion of the spring having stable engagement with said sprags on opposite sides thereof to space the latter circumferentially.

4. A sprag clutch comprising coaxial races having cylindrical race surfaces in radially spaced relation to one another, circumferentially spaced sprags oriented similarly in succession in the radial space between said races, said sprags having first and second arcuate, radially spaced surfaces for wedging engagement with and between said race surfaces, and being provided with generally radially extending side surfaces which are, respectively, of relatively flat and compound, convexly rounded contour on circumferentially opposite sides of the sprag to constitute a substantially D-shaped sprag outline in radial section at 90° to the race axes, and individual energizing leaf springs acting in the circumferential spaces between successive sprags and on said respective differently contoured surfaces thereof to urge each sprag toward wedging engagement with one of the race surfaces, said leaf springs each being of a generally U-shaped outline having a bight portion between spaced, convexly outwardly rounded shoulders, a pair of legs converging from said shoulders to inwardly concave waist portions which are relatively closely adjacent one another when the spring is compressed in engagement between successive sprags, and terminal leg portions diverging from said respective waist portions, one leg of each spring having engagement at a shoulder and terminal leg portion thereof with one of said radially extending surfaces of a sprag at one circumferential side of the spring, the other leg having a nested engagement at its waist portion with the convexly rounded surface of the sprag on the opposite circumferential side of the spring, said other leg having its terminal portion engaging and exerting force on said last named sprag on a line at a distance from one of said wedging sprag surfaces less than the corresponding distance from the same surface to the point of sprag engagement and line of force exerted by the first named terminal leg portion of the spring, said bight portion of the spring having stable engagement with said sprags on opposite sides thereof to space the latter circumferentially.

5. A sprag clutch comprising coaxial races having cylindrical race surfaces in radially spaced relation to one another, circumferentially spaced sprags oriented similarly in succession in the radial space between said races, said sprags having first and second arcuate, radially spaced surfaces for wedging engagement with and between said race surfaces, and being provided with generally radially extending side surfaces which are, respectively, of relatively flat and compound, convexly rounded contour on circumferentially opposite sides of the sprag to constitute a substantially D-shaped sprag outline in radial section at 90° to the race axes, and individual energizing leaf springs acting in the circumferential spaces between successive sprags and on said respective differently contoured surfaces thereof to urge each sprag toward wedging engagement with one of the race surfaces, said leaf springs each being of a generally U-shaped outline having a bight portion between spaced, convexly outwardly rounded shoulders, a pair of legs converging from said shoulders to inwardly concave waist portions which are relatively closely adjacent one another when the spring is compressed in engagement between successive sprags, and terminal leg portions diverging from said respective waist portions, one leg of each spring having engagement at a shoulder and terminal leg portion thereof with said relatively flat surface of a sprag at one circumferential side of the spring, the other leg having a nested engagement at its waist portion with the convexly rounded surface of the sprag on the opposite circumferential side of the spring, said other leg having its terminal portion engaging and exerting force on said last named sprag on a line at a distance from one of said wedging sprag surfaces less than the corresponding distance from the same surface to the point of sprag engagement and line of force exerted by the first named terminal leg portion of the spring, said bight portion of the spring having stable engagement with said sprags on opposite sides thereof to space the latter circumferentially.

6. A sprag clutch comprising coaxial races having cylindrical race surfaces in radially spaced relation to one another, circumferentially spaced sprags oriented in succession in the radial space between said races, said sprags having first and second arcuate, radially spaced surfaces for wedging engagement with and between said race surfaces, and being provided with generally radially extending side surfaces, and individual energizing leaf springs acting in the circumferential spaces between successive sprags and on said respective surfaces thereof to urge each sprag toward wedging engagement with one of the race surfaces, said leaf spring each being of a generally U-shaped outline having a bight portion between spaced, convexly outwardly rounded shoulders, a pair of legs converging from said shoulders to inwardly concave waist portions which are relatively closely adjacent one another when the spring is compressed in engagement between successive sprags, and terminal leg portions diverging from said respective waist portions, one leg of each spring having engagement at a shoulder and terminal leg portion thereof with one of said radially extending surfaces of a sprag at one circumferential side of the spring, the other leg having engagement at its waist portion with the sprag on the opposite circumferential side of the spring, said bight portion of the spring having stable engagement with said sprags on opposite sides thereof to space the latter circumferentially.

7. A force transmitting mechanism comprising an annular series of sprags acting between a pair of concentric races to either lock the latter for rotation together or permit overrunning of one race relative to the other, said sprags having at least one circumferentially facing surface of outwardly convex shape, and leaf springs interposed between successive sprags of the series, the springs including means engageable with sprags on either side thereof to space said sprags in proper circumferential relation to one another, biasing means engageable with said successive sprags in radially spaced relation to said spacing means to exert biasing action on the sprags, and a portion of circumferentially outwardly concave shape connecting said biasing means with said spacing means, said portion having nesting engagement with said circumferentially convex surface of an adjacent sprag to maintain said spacing means in proper sprag spacing position.

8. A force transmitting mechanism comprising an annular series of sprags acting between a pair of concentric races to either lock the latter for rotation together or permit overrunning of one race relative to the other, said sprags having at least one circumferentially facing surface of outwardly convex shape, and leaf springs interposed between successive sprags of the series, the springs being of generally U-shaped outline and including a bight portion engageable with sprags on either side thereof to space said sprags in proper circumferential relation to one another, a pair of divergent legs engageable respectively with said successive sprags in radially spaced relation to said bight portion to exert biasing action on the sprags, and at least one waist portion of circumferentially outwardly concave shape connecting one of said legs with said bight portion, said waist portion having nesting engagement with said circumferentially convex surface of an adjacent sprag to maintain said bight portion in proper sprag spacing position.

9. A sprag clutch energizing leaf spring for engagement between successive clutch sprags of a circumferential series to space the sprags circumferentially and urge the sprags for clutching engagement with a clutch race, said spring being of a generally U-shaped outline having a bight portion including a bridge element of non-circular outline and substantially elongated dimension in the circumferential sense of the sprag series, and a pair of spaced, convexly outwardly rounded shoulders with which the ends of said bridge element merge, said shoulders being formed on relatively abrupt curves to store substantial energy therein when the spring is compressed in engagement between successive sprags, a pair of legs converging toward one another from said shoulders to inwardly concave waist portions of mild curvature which are relatively closely adjacent one another when the spring is compressed, and terminal leg portions diverging from said respective waist portions.

References Cited in the file of this patent
UNITED STATES PATENTS

| | | |
|---|---|---|
| 1,331,677 | Schachter | Feb. 24, 1920 |
| 2,046,087 | Pountnay | June 30, 1936 |
| 2,707,092 | Bowditch | Apr. 26, 1955 |
| 2,904,148 | Schneider et al. | Sept. 15, 1959 |

FOREIGN PATENTS

| | | |
|---|---|---|
| 506,287 | Canada | Oct. 5, 1954 |